US006239947B1

(12) United States Patent
Fan et al.

(10) Patent No.: US 6,239,947 B1
(45) Date of Patent: May 29, 2001

(54) MILLIACTUATOR WITH INTEGRATED SENSOR AND DRIVERS AND METHOD OF MANUFACTURING THE SAME

(75) Inventors: Long-Sheng Fan; Ju Hi Hong, both of San Jose, CA (US); Wen-Han Juan, Vancouver, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/076,331

(22) Filed: May 11, 1998

(51) Int. Cl.[7] .............................. G11B 5/55; G11B 21/10
(52) U.S. Cl. ............................................ 360/104; 360/109
(58) Field of Search .................................... 360/103, 104, 360/106, 109

(56) References Cited

U.S. PATENT DOCUMENTS

| 4,809,103 | | 2/1989 | Lazzari ................................. 360/103 |
| 5,216,559 | * | 6/1993 | Springer .............................. 360/106 |
| 5,325,244 | | 6/1994 | Takano et al. ..................... 360/77.03 |
| 5,400,192 | * | 3/1995 | Mizoshita et al. .................. 360/106 |
| 5,438,469 | | 8/1995 | Rudi ..................................... 360/109 |
| 5,570,336 | | 10/1996 | Inui et al. ........................... 364/126 |
| 5,781,381 | * | 7/1998 | Koganezawa et al. .............. 360/106 |
| 5,793,571 | * | 8/1998 | Jurgenson et al. .................. 360/104 |
| 5,805,382 | * | 9/1998 | Lee et al. ............................ 360/104 |
| 5,898,541 | * | 4/1999 | Boutaghou et al. ................ 360/109 |

FOREIGN PATENT DOCUMENTS

| 58-118017 | | 7/1983 | (JP) . |
| 60-616 | | 1/1985 | (JP) . |
| 63-291271 | | 11/1988 | (JP) . |
| 1-181580 | | 7/1989 | (JP) . |
| 8-180623 | | 7/1996 | (JP) . |
| 9-180381 | * | 7/1997 | (JP) . |

* cited by examiner

Primary Examiner—Jefferson Evans
(74) Attorney, Agent, or Firm—Noreen A. Krall

(57) ABSTRACT

A milliactuator integrated with driver and relative position error sensor circuits formed on a single silicon substrate. The integrated milliactuator/electronics module is positioned between the suspension and the slider/transducer assembly to provide rapid, small motion position control of the slider/transducer over data tracks on the disk of a magnetic disk drive. Integration of the milliactuator electronics with the milliactuator reduces parasitic loading and interference problems with the magnetic transducer signals. Electronic circuits are built on a silicon wafer followed by deposition of a planarization layer and a ground plane layer for isolation from the milliactuator which is then built on top of the circuits.

20 Claims, 7 Drawing Sheets

MILLIACTUATOR WITH INTEGRATED SENSOR AND DRIVERS AND METHOD OF MANUFACTURING THE SAME

BACKGROUND OF THE INVENTION

1. Field of the Invention

This invention relates in general to integral recording head milliactuators, and more particularly, to a milliactuator with integrated sensor and driver electronics and a process for making the same.

2. Description of Related Art

Moving magnetic storage devices, especially magnetic disk drives, are the memory device of choice. This is due to their expanded non-volatile memory storage capability together with a relatively low cost. Accurate retrieval of the stored information from these devices becomes critical, requiring the magnetic transducer to be positioned as close to the storage media as possible. In some storage devices, the transducer may actually contact the media.

Magnetic disk drives are information storage devices which utilize at least one rotatable magnetic media disk having concentric data tracks defined for storing data, a read/write transducer for reading data from and/or writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk.

Alternatively, the transducer may operate in contact with the surface of the disk. Thus the suspension provides desired slider loading and dimensional stability between the slider and an actuator arm which couples the transducer/slider/suspension assembly to the actuator. The suspension is required to maintain the transducer and the slider adjacent the data surface of the disk with as low a loading force as possible. The actuator positions the transducer over the correct track according to the data desired on a read operation or to the correct track for placement of the data during a write operation. The actuator is controlled by a servo to position the transducer over the desired data track by shifting the combination assembly across the surface of the disk in a direction generally transverse to the data tracks. A disk drive servo control system controls movement of the actuator arm across the surface of the disk to move the magnetic recording head from data track to data track, once over a selected track, to maintain the head in a path over the centerline of the selected track. Maintaining the head centered over a track facilitates accurate reading and recording of data in the track.

A trend in magnetic disk drives is that the magnetic bit size which may be reliably written and read by the magnetic recording head continues to decrease at a rate around 50% per year. As a consequence, the width of the track which contains the sequential bits must also diminish at roughly half this rate. Thus, an advanced storage device having 4000 to 6000 tracks per inch (tpi) today is likely to have 20 to 25 ktpi within a few years. This projected increase in data density places extreme requirements on the precision with which the actuator system brings the recording head to the data track and maintains the head over the track. The offset between the actual head position and the track center, called the track mis-registration (TMR), scales as the width of the track (approximately 12% of the track-to-track pitch).

As the track density increases and the allowable TMR decreases, the speed or servo bandwidth with which the head positioning servo system can respond must also increase to allow effective track following. One method of increasing this bandwidth is the use of a second actuator (a milliactuator) to provide rapid, small-motion, position correction of the recording head. In this concept, the usual actuator provides coarse position control, and the milliactuator located at the individual head provides fine control of head position over the selected track. In order to achieve high track density, these milliactuators must have a range of motion on the order of a few track pitches and a force output that can impart 10 to 30 G acceleration to the recording head. For the integrated milliactuator/head designs the mass involved is the mass of the slider plus the mass of the movable part of the milliactuator, totaling a few milligrams. A piggyback electrostatic milliactuator positioned between a suspension flexure and a recording head can achieve the positional accuracy and high speed performance required in future high track density applications. Such an electrostatic milliactuator needs high drive voltages and capacitive position sensing signals for good servo control.

A problem with positioning the milliactuator between the suspension flexure and the recording slider is that the drive signal and the capacitive sense signal need to travel through wiring on the suspension. The readback signal and the write current signal also travel through wires placed on the suspension in close proximity to the milliactuator wires. The wiring between the milliactuator and the drive/sense integrated circuit chip adds parasitic load and introduces interferences to the readback signal.

It therefore can be seen that there is a need for a method for reducing or eliminating the interaction and interference between milliactuator drive and control signals and the recording head readback signal.

SUMMARY OF THE INVENTION

To overcome the shortcomings of the prior art described above, it is the object of the present invention to disclose an integrated milliactuator and a method to integrate the milliactuator driver circuit with the milliactuator, thus eliminating interferences to the magnetic readback signal caused by interconnections on the suspension.

It is another object of the present invention to disclose a method of integrating a relative positioning error sensor circuit on the milliactuator using common milliactuator electrodes.

It is yet another object of the present invention to disclose a method to integrate the milliactuator driver, the position error sensor circuit and the other signal conditioning circuits on the same silicon substrate the milliactuator is built on.

It is still another object of the present invention to disclose a method for fabricating the milliactuator with milliactuator driver, position error sensing circuits and other signal conditioning circuits on a single silicon substrate.

It is a still further object of the present invention to disclose a method to further integrate other signal conditioning circuits on the milliactuator including, but not restricted to, the servo feedback controller, the write head driver, the read head preamplifier, and electrostatic discharge (ESD) diodes.

Briefly stated, the present invention achieves the above described objects by integrating the milliactuator driver and RPE sensing circuits with the milliactuator thus eliminating the parasitic load to the milliactuator driver/sensor integrated circuit (IC) and interferences to the magnetic readback signal caused by the interconnecting leads to the milliactuator. In accordance with the present invention, a milliactuator driver circuit and a relative position error (RPE) signal sensing circuit are integrated into the same silicon substrate the milliactuator is built on. Other signal conditioning circuits can also be built with the driver circuits.

The milliactuator can further be directly built on top of these circuits to reduce the total chip area by using steps of the following method. After the circuits are built, passivated and vias for contact pads opened, a planarization layer, an isolation layer, and conducting layer (such as a ground plane) are deposited and patterned on top of the circuit to isolate the circuit from possible milliactuator interference. The milliactuator is then integrated on top of the circuits and finally released in a sacrificial layer etch process.

The above as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENT

This invention is described in a preferred embodiment in the following description with reference to the Figures, in which like numbers represent the same or similar elements. While the invention is described in terms of the best mode for achieving the invention's objectives, it will be appreciated by those skilled in the art that variations may be accomplished in view of these teachings without deviating from the spirit or scope of the invention.

Figure 1:
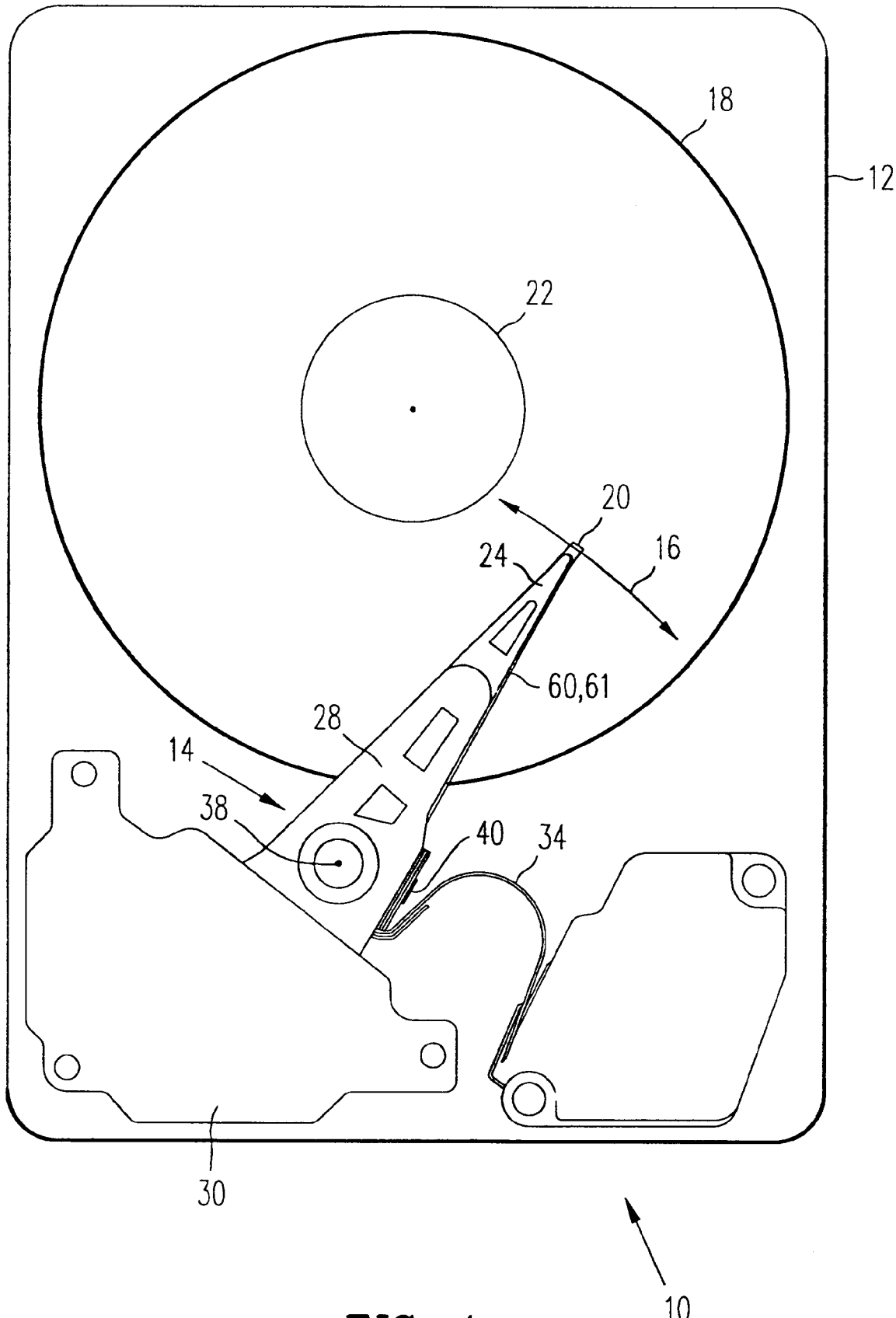
FIG. 1 illustrates a magnetic storage system according to the present invention.

FIG. 1 illustrates a magnetic storage system 10 including a housing 12 in which is mounted a rotary actuator 14, one or more associated magnetic storage disks 18 mounted on a spindle 22 and a drive means (not shown) coupled to spindle 22 for rotating the disk 18. The rotary actuator 14 moves a slider/milliactuator assembly 20 in accordance with the present invention in an arcuate path 16 across the surface of the storage disk 18. The rotary actuator 14 includes a voice coil motor comprising a coil (not shown) movable within the magnetic field of a fixed permanent magnetic assembly 30. An actuator arm 28 having the moving coil formed on one end thereof is pivotally mounted on pivot post 38. A suspension assembly 24 is attached to the other end of the actuator arm 28 and projects across the surface of the (disk 18. The suspension assembly 24 supports an integrated slider/milliactuator assembly 20 in cantilever fashion over the surface of the disk 18. Although only one slider/milliactuator is shown, it will be recognized that the magnetic storage system 10 has one slider/milliactuator assembly 20 for each side of each disk 18 included in the magnetic storage system 10.

The magnetic storage system 10 further includes an actuator chip 40 fixed on the rotary actuator 14. As is well known in the art, actuator chip 40 cooperates with the slider/milliactuator assembly 20 on the suspension assembly 24 to read data from or write data to the disks 18. Electrical leads 60, 61 supported on actuator arm 28 and suspension assembly 24 carry signals between the actuator chip 40 and the slider/milliactuator assembly 20. A flexible printed circuit member or actuator flex cable 34 carries signals between the actuator chip 40 and a connector pin assembly not shown) which interfaces with the external signal processing electronics.

Figure 2:
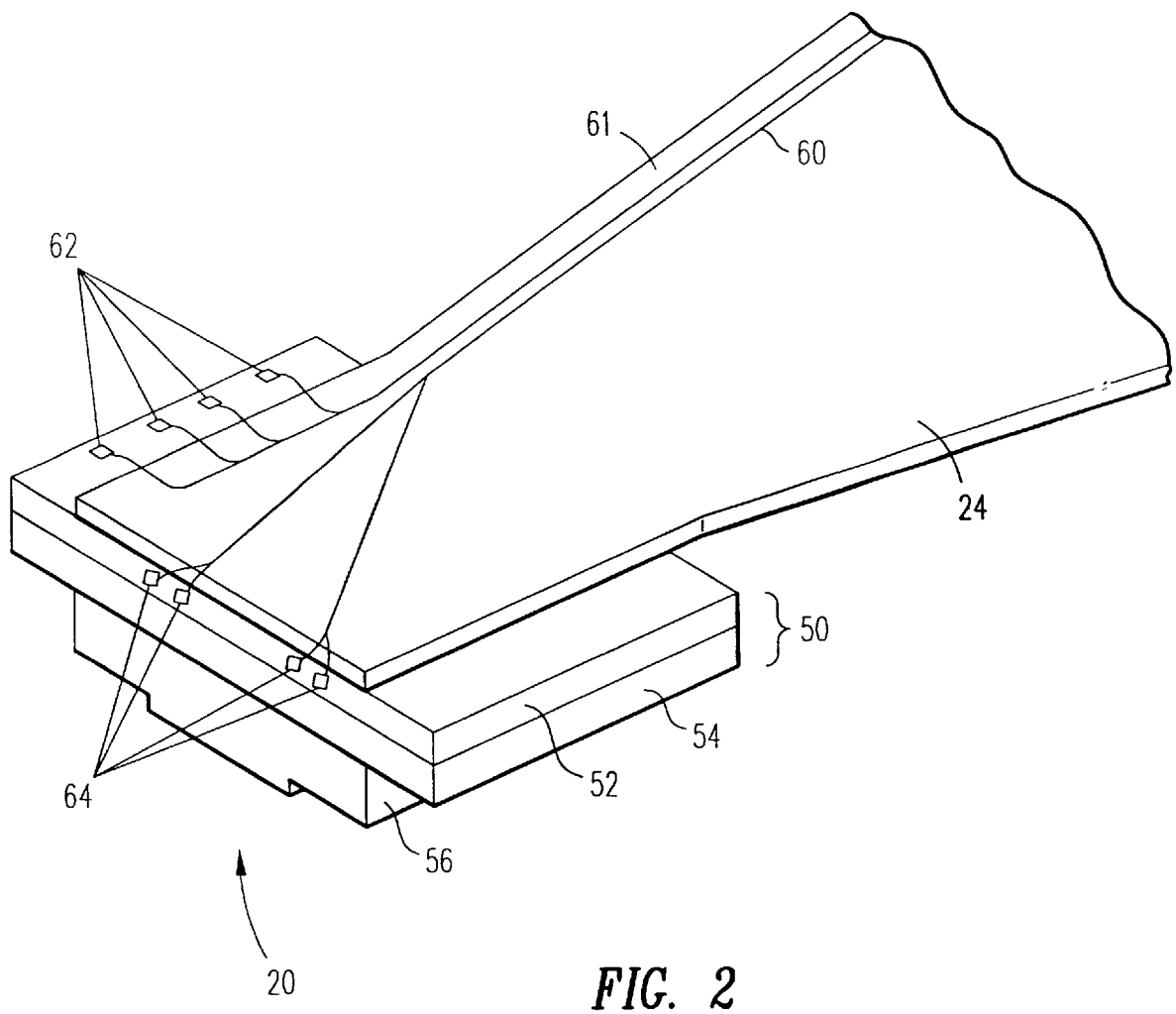
FIG. 2 is a perspective view of a milliactuator with integrated driver and sensor circuits positioned between a suspension flexure and a slider/transducer assembly.

FIG. 2 illustrates an integrated slider/milliactuator assembly 20 fixed to the suspension assembly 24 according to the preferred embodiment of the present invention. The suspension assembly 24 supports the slider/milliactuator assembly 20 over the surface of the disk on a bearing or cushion of air generated by the rotation of the disk. The slider/milliactuator assembly 20 comprises an integrated milliactuator/electronics module 50 and an integrated slider/transducer assembly 56. The integrated milliactuator/electronics module 50 comprises an electronics module 52 portion integrally formed with a milliactuator 54 portion according to the procedure set forth herein. The slider/transducer assembly 56 is fixed to the milliactuator 54 portion and the electronics module 52 portion is fixed to the suspension assembly 24. Electrical leads 60, 61 connected to contact pads 62 and 64 on the electronics module 52 carry signals to and from the actuator chip 40.

Figure 3:
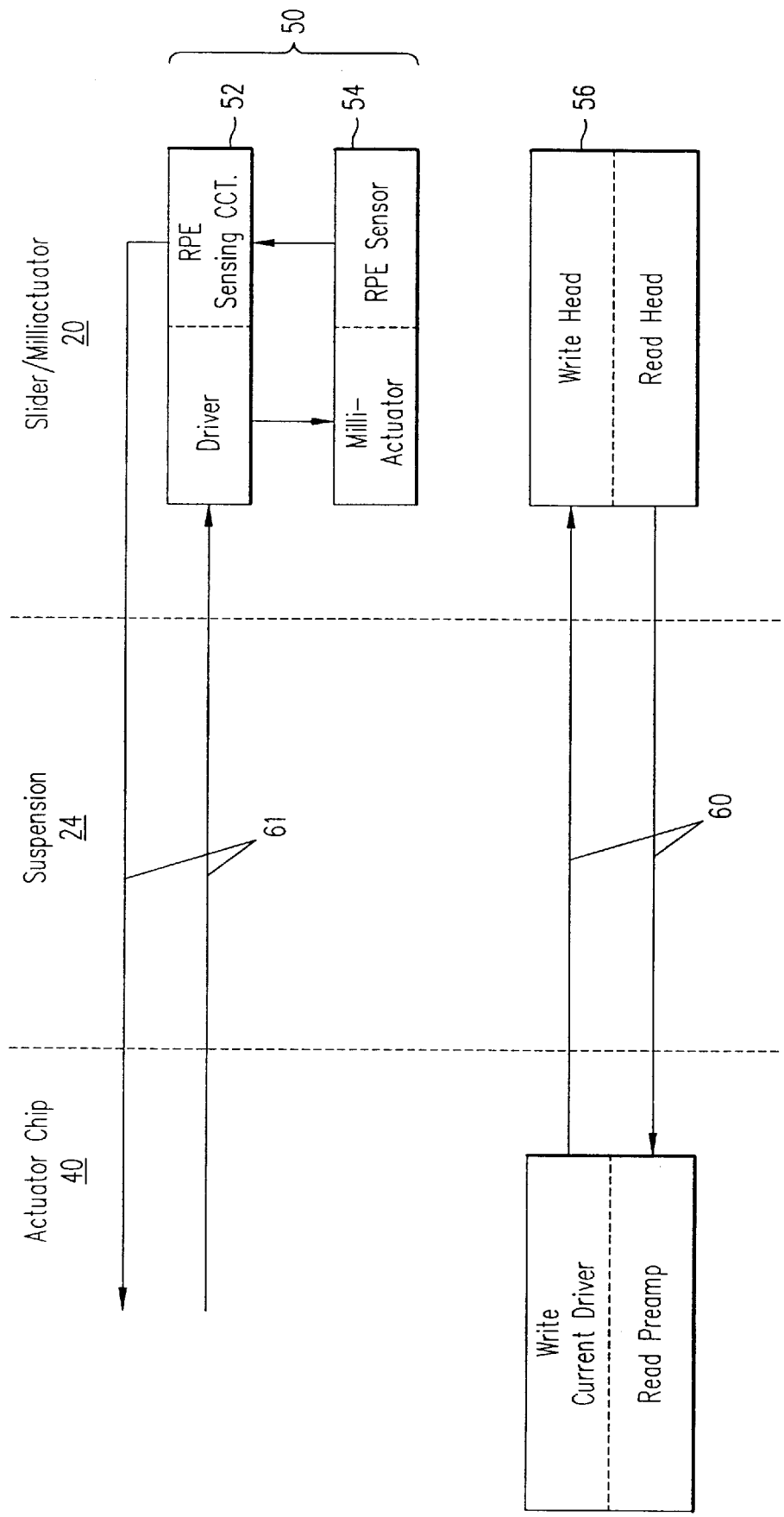
FIG. 3 is a block diagram illustrating the positioning of the milliactuator driver and sensor circuits of the present invention relative to the suspension.

FIG. 3 illustrates the placement of the milliactuator driver and sensor circuits located in electronics module 52 relative to the suspension assembly 24 and the actuator chip 40 for the preferred embodiment of the present invention. Placement of the milliactuator driver and sensor circuits in the integrated milliactuator/electronics module 50 provides the shortest path for signals needed by milliactuator 54 from electronics module 52 to control the fine positioning of the slider/transducer assembly 56 to the desired data track on the disk 18. Positioning the electronics module 52 in close proximity to the milliactuator 54 rather than at the actuator chip 40 eliminates unwanted parasitic signal losses and interferences associated with the long (2 to 5 cm) electrical lead lengths otherwise required. The electrostatic milliactuator used for fine positioning of the slider/transducer assembly 56 needs high drive voltages and servo control provided by the relative position error signal (RPE) from a capacitive sensor. When the electronics module 52 is positioned at actuator chip 40, the drive voltage (about 80 volts at 2.5 Khz) and sensed capacitance (about 100 fF) will travel on electrical leads 61 on the suspension assembly 24 and actuator arm 28 in close proximity to the electrical leads 60 carrying the magnetic write current signal to and the readback signal from slider/transducer assembly 56. Long leads introduce large parasitic loads to the circuits and interference to the magnetic readback signal. These undesirable effects of long leads are largely eliminated by the present invention placing the milliactuator driver and the RPE sensing circuit in the electronics module 52 integrated with milliactuator 54. The signals between the electronics module 52 and the actuator chip 40 are now replaced by a DC bias voltage to the milliactuator driver and an amplified RPE signal from the position sensing circuit.

Figure 4A:
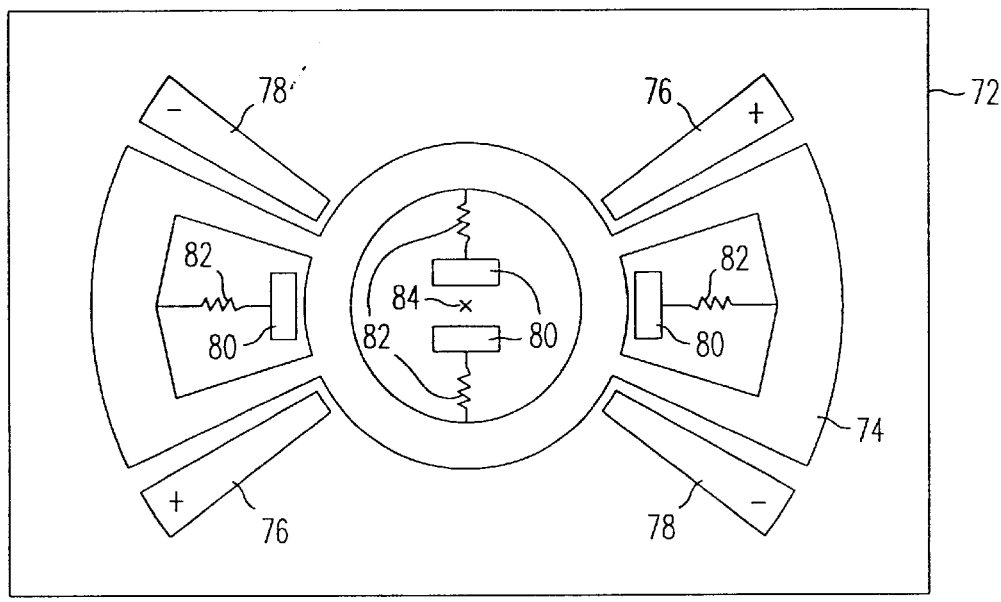
FIG. 4a is a plan view of a simplified electrostatic rotary milliactuator.

FIG. 4a illustrates a simplified electrostatic rotary milliactuator 54 formed by micromachining processes known to the art. Milliactuator 54 formed on a substrate 72 comprises a rotor structure 74 separated from and free to rotate through small angles relative to substrate 72, a plurality of stator structures 76, 78 disposed in close proximity to the rotor structure 74 and rigidly fixed to substrate 72, and a number of spring structures 82 providing mechanical support for rotor structure 74 by attachment to a like number of support posts 80 rigidly attached to substrate 72. Spring structures 82 are formed by micromachining processes to provide translational rigidity of the rotor structure 74 relative to the substrate 72 while allowing relatively free rotational motion (in the plane of the paper) of the rotor structure 74 about its center of symmetry 84. Rotor structure 74, stator structures 76, and stator structures 78 are formed of electrically conducting materials electrically isolated from each other by a suitable thin film lead structure formed on substrate 72. Voltages applied to the rotor and stator structures induce attractive and repulsive electrostatic forces between the rotor structure 74 and the stator structures 76, 78 resulting in rotation of the rotor structure 74 against the weak constraining forces of spring structures 82. The rotational displacement of the rotor structure 74 can be measured by a suitable sensor and the signal used to provide feedback to a controller in the form of a relative position error (RPE) signal. The capacitance between rotor structure 74 and either stator structures 76 or stator structures 78 may be used to provide the RPE signal. The design and processes for fabricating milliactuator 54 structures are known to the art.

The embodiment of the present invention integrates milliactuator 54 with the integrated circuit (IC) chip forming electronics module 52 containing the driver and RPE sensing circuits. Integration to form the milliactuator/electronics module 50 is accomplished by forming suitable integrated circuits for the milliactuator driver and RPE sensing functions on a silicon substrate using processes well known to the art, followed by further processes to form the proper electrical connections of the driver and RPE sensing circuits to milliactuator 54. The integrated milliactuator/electronics module 50 is then completed by forming the milliactuator 54 on and in contact with the electronics module 52 using film deposition and micromachining processes.

Figure 4B:
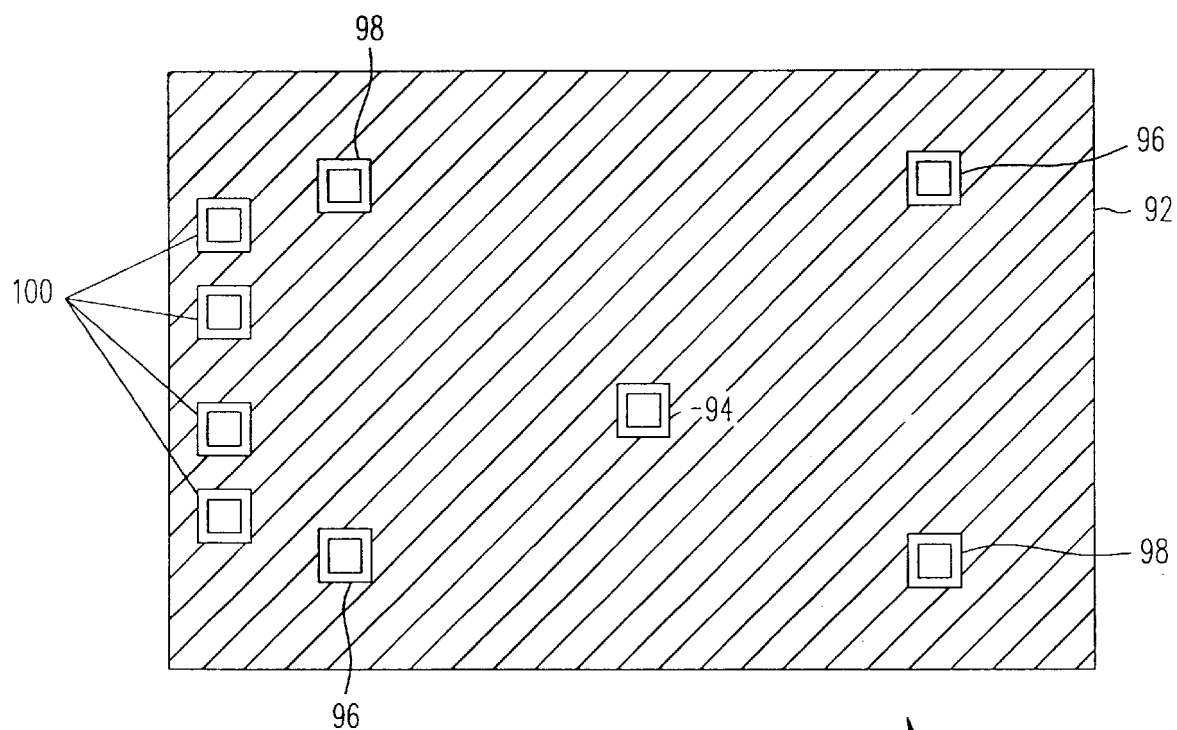
FIG. 4b is a plan view of the groundplane with via locations for electrical connections to the rotary milliactuator of the integrated electronics module of this invention.

FIG. 4b is a plan view of electronics module 52 illustrating features of the required interface between electronics module 52 and milliactuator 54. The interface must provide electrical connections from the driver and RPE sensing circuits in the electronics module 52 to the rotor structure 74 and the stator structures 76, 78. In addition, the interface must provide adequate electrical shielding between the electronics module 52 and the milliactuator 54 to screen the electronic circuits from the high electric fields required to deflect rotor structure 74. Electrical access to the driver and RPE sensing circuits are provided by small holes or vias formed by well known photolithography and etching processes to allow electrical contact to be made by subsequent metal depositions. A via 94 is for electrical connection to rotor structure 74, four vias 96, 98 are for contact to stator structures 76, 78 and four other vias 100 are for contact to input and output signals to the milliactuator/electronic module 50 from the external signal processing electronics. Electrical shielding is provided by a metal layer 92 formed on electronics module 52 over the entire interface surface between electronics module 52 and milliactuator 54. Shielding by metal layer 92 is very effective since it forms a ground plane with the dimensions of electronic module 52 (about 1 to 2 mm on a side) while the diameter of each of the vias 92–100 is only about 100 $\mu$m.

Figure 5A:
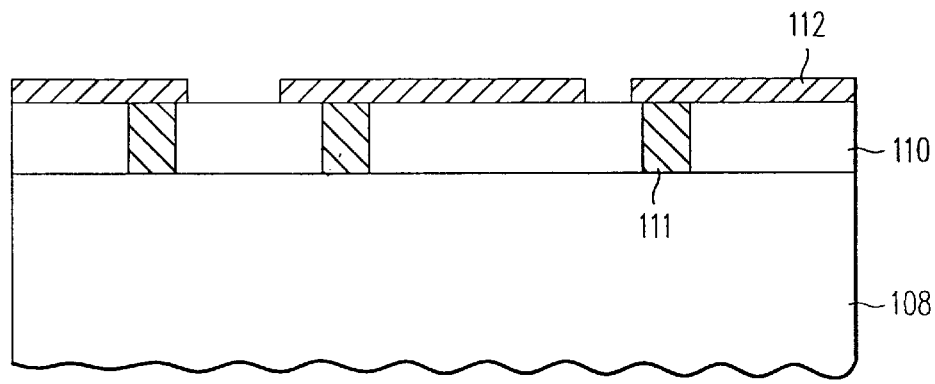
FIGS. 5a–e illustrates one embodiment of the fabrication process for integrating the electronic circuits with the milliactuator.
Figure 5B:
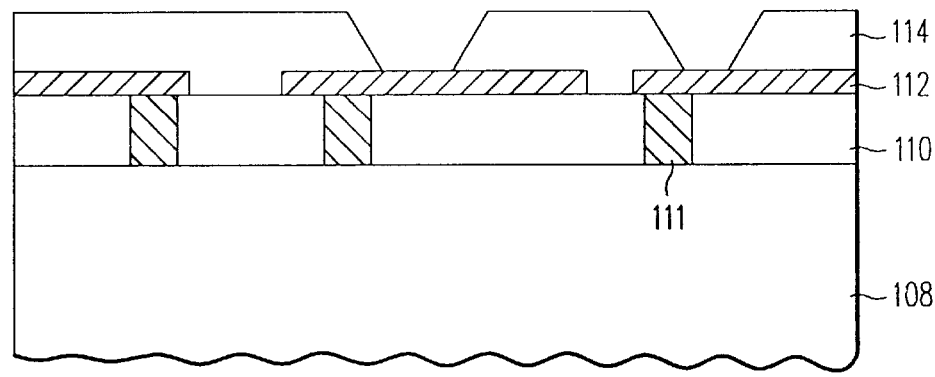
Figure 5C:
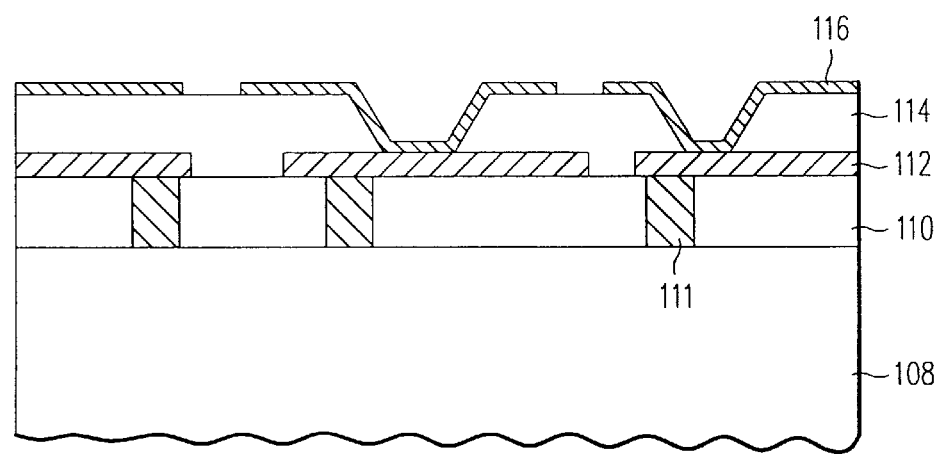
Figure 5D:
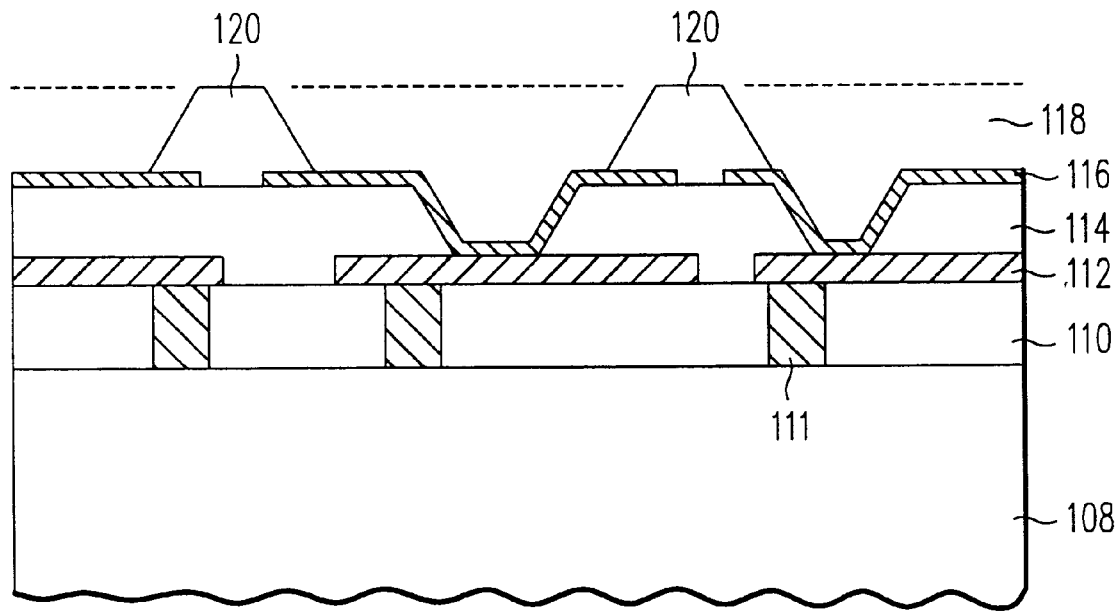
Figure 5E:
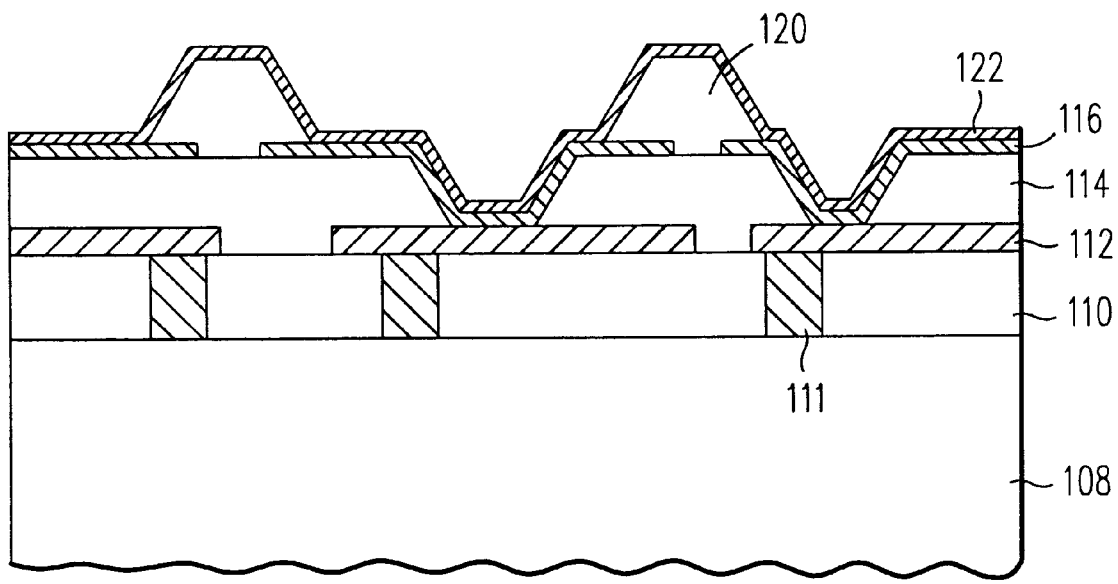

Now referring to FIGS. 5a–e, the process for producing the integrated milliactuator/electronics module 50 according to the present invention will be explained. Briefly, FIG. 5a shows a shielded Si circuit wafer; FIG. 5b shows a passivated and planarized Si circuit wafer with PIX; FIG. 5c shows the metal interconnect/passivation layer deposition and patterning; FIG. 5d shows the sacrificial layer deposition and patterning and FIG. 5e shows the seed layer deposition. The key aspects of the integrated circuit with microactuator include the metal layer to shield the electrical fields (for example, aluminum M3 layer in the IC), a thick layer to planarize the IC topography (for example, PIX, a form of polyimide), a passivation layer to prevent any process influence to the IC ( for example, a combination of PIX and Tungsten (W), which act as a diffusion barrier) and a via hole to connect between the IC and microactuator. In the described example, the Tungsten is also used as the interconnect for the microactuator.

Described in more detail, the process begins as shown in FIG. 5a, which illustrates a silicon wafer 108 on which driver and RPE sensing circuits have been built, passivated and vias opened using processes well known to the art. A silicon oxide planarization and isolation layer 110 of about 1–2 microns thickness is deposited over the passivated silicon wafer 108 by a chemical vapor deposition or a plasma enhanced deposition process. An Al—Si—Cu or Cu layer 112 of about 1 $\mu$m thickness is deposited over the planarized layer 110 by a sputter deposition process to form the ground plane 92 (FIG. 4b). The Al—Si—Cu layer 112 is patterned using photoresist and a chemical etchant or reactive ion etching to define isolated contact pads electrically connected through the vias to the driver and RPE sensing circuits. Tungsten (W) 111 inside the vias opened in silicon dioxide isolation layer 110 for connecting Al—Si—Cu contact pads with the electronic circuits is deposited by a chemical vapor deposition process. A dielectric PIQ (or PIX) polyimide layer 114 of about 5 $\mu$m thickness is deposited by spin coating. The PIQ (or PIX) layer 114 is patterned using a mask and chemical solvent to open vias to the isolated contact pads defined in the Al—Si—Cu layer 112. The resulting structure is illustrated in FIG. 5b.

The milliactuator 72 structure starts with a tungsten (W) or other metal layer 116 of about 0.2 $\mu$m thickness deposited over the PIQ (or PIX) layer 114 using a sputtering process. The W layer 116 is patterned using a photoresist and chemical etchant to define isolated interconnect pads electrically connected to the contact pads defined in Al—Si—Cu layer 112 through the vias opened in the PIQ (or PIX) layer 116. The resulting interconnect structure is shown in FIG. 5c. An Al$_2$O$_3$ or Cu layer 118 of about 3 $\mu$m thickness deposited on W layer 116 is patterned using photoresist and chemical etching processes to leave a sacrificial layer 120 on which the milliactuator high aspect ratio rotor and stator structures will be formed. The resulting structure is shown in FIG. 5d. A stack of Chromium (Cr) and Copper (Cu) seed layer 122 of about 1000. A thickness is deposited using a sputtering process on the entire surface comprising patterned sacrificial layer 120 and W layer 116. The resulting structure is shown in FIG. 5e. Seed layer 122 provides a suitable substrate for Ni—Fe plating processes to form the milliactuator. The milliactuator fabrication is completed by methods known to the art using Ni—Fe plating, photoresist and lithography processes. The milliactuator is finally released in a sacrificial layer etch process to remove the $Al_2O_3$ or Cu sacrificial layer.

The completed integrated milliactuator/electronics module 50 has a bonding platform fixed to the rotor structure of the milliactuator 54. The slider/transducer assembly 56 is bonded to the bonding platform using adhesive or other suitable means. The entire assembly of milliactuator/electronics module and slider/transducer is now bonded to the suspension flexure 24 using methods well known to the art. Fixing the electronics module portion of the integrated milliactuator/electronics module to the suspension flexure 24 and the slider/transducer assembly 56 to the milliactuator rotor structure is the preferred method since this configuration minimizes the mass moved by the milliactuator during adjustments of the position of the transducer over the data tracks on disk 18. Leads 61 are now bonded to the pads 62 on the electronics module 52 and leads 60 to the pads 64 on the slider/transducer assembly 56 using methods well known to the art.

Figure 6:
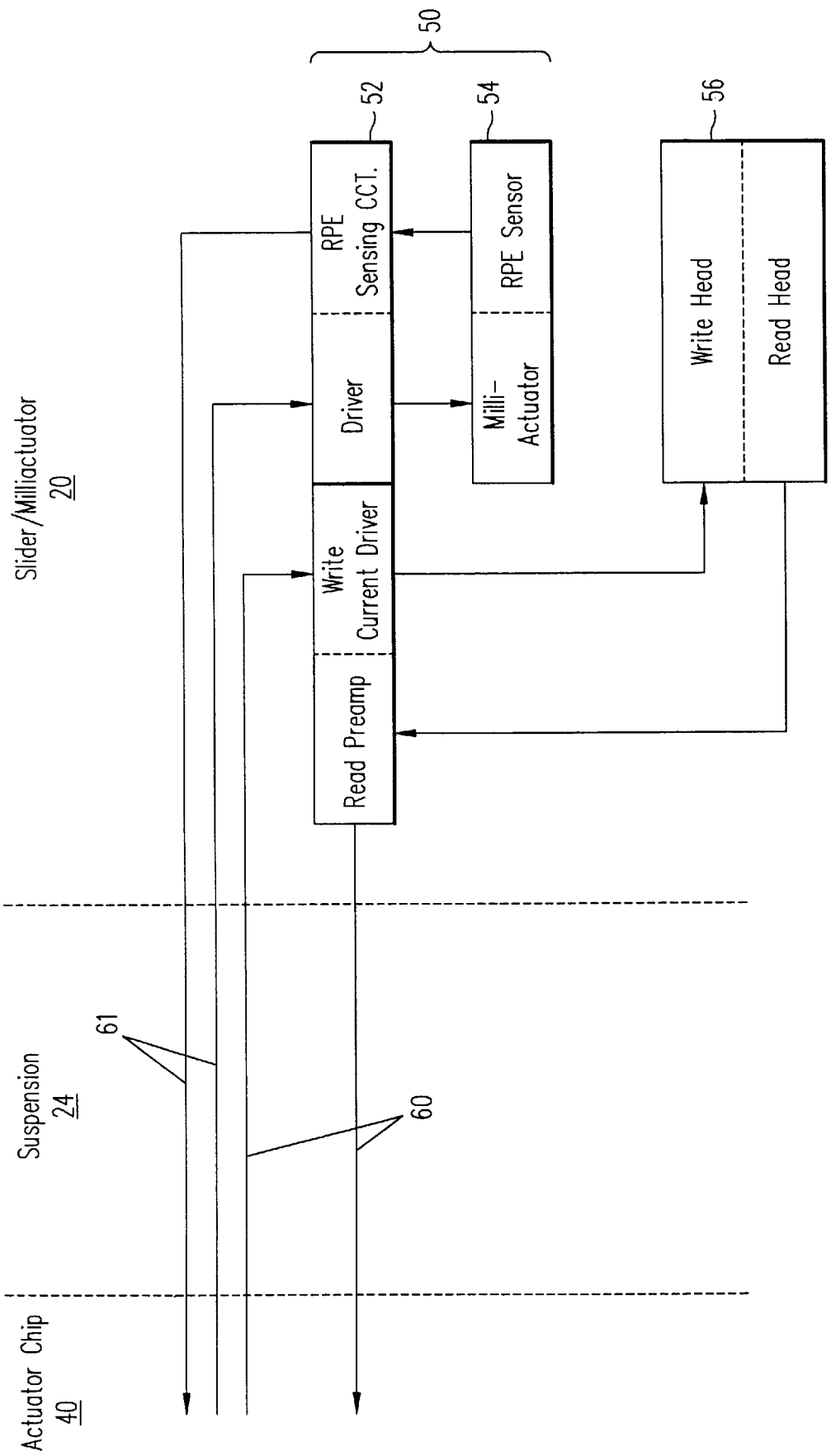
FIG. 6 is a block diagram of a second embodiment of the present invention illustrating the positioning of the milliactuator and magnetic transducer electronics relative to the suspension.

FIG. 6 shows a second embodiment of the present invention wherein a further integration of the electronic circuits is carried out by incorporating the write current driver and the read preamplifiers for the magnetic signal transducer of the slider/transducer assembly 56 into the electronics module 52. In this embodiment, the write current driver and the read preamplifier circuits which comprise part of the actuator chip 40 in the prior art, are now formed in the electronics module 56 integrated circuit chip during the processing to form the driver and RPE sensing circuits for the milliactuator 54. The write current driver and read preamplifier are now electrically connected to the write head and read head, respectively, on the slider/transducer assembly 56 using much shorter lead lengths than previously used. The advantages of this placement of the magnetic transducer circuits include reduced interference from the large amplitude write current signal and improved signal to noise for the magnetic readback signal. Control signals to the write current driver and amplified readback signals from the read head are carried by leads 60 from the electronics module 52 to the actuator chip 40. Processing steps to integrate the electronics module 52 with the milliactuator 54 for this second embodiment are identical to those described earlier for the preferred embodiment using FIGS. 5a–e.

While the embodiments of the present invention have been described with reference to a rotary milliactuator, it will be obvious to those familiar with the art that a linear milliactuator may also be used in the present invention.

It will also be obvious to those familiar with the art, that integration of other signal conditioning circuits including, but not restricted to, the servo feedback controller and electronic discharge (ESD) diodes into the milliactuator/electronics module 50 may also be used in the present invention.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

What is claimed is:

1. An integrated slider/milliactuator assembly for use in a magnetic storage system comprising:
   an electronics module;
   a milliactuator formed on the electronics module; and
   a slider/transducer assembly juxtaposed the milliactuator, the slider/transducer assembly for reading and/or writing data in the magnetic storage system.

2. The integrated slider/milliactuator assembly for use in a magnetic storage system as set forth in claim 1, wherein the electronics module is further comprised of a milliactuator driver circuit and a sensor circuit both of which are electrically connected to the milliactuator.

3. The integrated slider/milliactuator assembly for use in a magnetic storage system as set forth in claim 2, further comprising an electrical shield between the electronics module and the milliactuator.

4. The integrated slider/milliactuator assembly for use in a magnetic storage system as set forth in claim 3, wherein said shield is a metal layer formed on the electronics module over the entire interface surface between the electronics module and the milliactuator.

5. The integrated slider/milliactuator assembly for use in a magnetic storage system as set forth in claim 3, wherein the milliactuator is further comprised of:
   a substrate;
   a rotor structure separated from and free to rotate through angles relative to the substrate;
   a plurality of stator structures disposed proximate the rotor structure and rigidly fixed to the substrate; and
   at least one spring structure providing mechanical support for the rotor structure by attachment to at least one support post rigidly attached to the substrate.

6. The integrated slider/milliactuator assembly for use in a magnetic storage system as set forth in claim 5, wherein the rotor structure and stator structures are formed of electrically conducting materials electrically isolated from each other by a thin film lead structure formed on the substrate.

7. The integrated slider/milliactuator assembly for use in a magnetic storage system as set forth in claim 6, wherein voltage applied to the rotor structure and stator structures induce attractive and repulsive electrostatic forces between the rotor structure and stator structures, thereby resulting in rotation of the rotor structure against constraining forces of the spring structures.

8. A magnetic storage system comprising:
   a disk with a data surface of concentric data tracks;
   a spindle shaft supporting said disk, said spindle shaft for rotating said disk about an axis generally perpendicular to the disk;
   an integrated slider/milliactuator assembly maintained in operative relationship with the data surface when the disk is rotating, the slider/milliactuator assembly further comprising an electronics module; a milliactuator formed on the electronics module; and a slider/transducer assembly juxtaposed the milliactuator, the slider/transducer assembly for reading and/or writing data in the magnetic storage system; and
   a controller for processing data read from and written to the data surface.

9. The magnetic storage system as set forth in claim 8, wherein the electronics module is further comprised of a milliactuator driver circuit and a sensor circuit both of which are electrically connected to the milliactuator.

10. The magnetic storage system as set forth in claim 9, further comprising an electrical shield between the electronics module and the milliactuator.

11. The magnetic storage system as set forth in claim 10, wherein said shield is a metal layer formed on the electronics module over the entire interface surface between the electronics module and the milliactuator.

12. The magnetic storage system as set forth in claim 10, wherein the milliactuator is further comprised of:

a substrate;

a rotor structure separated from and free to rotate through angles relative to the substrate;

a plurality of stator structures disposed proximate the rotor structure and rigidly fixed to the substrate; and at least one spring structure providing mechanical support for the rotor structure by attachment to at least one support post rigidly attached to the substrate.

13. The magnetic storage system as set forth in claim 12, wherein the rotor structure and stator structures are formed of electrically conducting materials electrically isolated from each other by a thin film lead structure formed on the substrate.

14. The magnetic storage system as set forth in claim 13, wherein voltage applied to the rotor structure and stator structures induce attractive and repulsive electrostatic forces between the rotor structure and stator structures, thereby resulting in rotation of the rotor structure against constraining forces of the spring structures.

15. A method of fabricating an integrated milliactuator/electronics module comprising the steps of:

forming a circuit on a substrate;

passivating the circuit;

depositing a planarization layer over the circuit;

opening vias to the circuit;

depositing a conducting layer on the planarization layer;

patterning the conducting layer to form contact pads electrically connected through the vias to the sensing circuit;

depositing a dielectric layer over the conducting layer;

patterning the dielectric layer to open vias to the contact pads defined in the conducting layer; and forming a milliactuator structure over the polyimide layer wherein a first conductive layer in the milliactuator structure is patterned to connect the contact pads in the conductive layer through vias opened in the polyimide layer.

16. The method of fabricating an integrated milliactuator/electronics module set forth in claim 15, wherein the circuit is an RPE sensing circuit.

17. The method of fabricating an integrated milliactuator/electronics module set forth in claim 15, wherein the circuit is an actuator driver circuit.

18. The method fabricating an integrated milliactuator/electronics module set forth in claim 15, wherein the fist conductive layer in the milliactuator structure is formed of Tungsten.

19. The method fabricating an integrated milliactuator/electronics module set forth in claim 15, wherein a second conductive layer in the milliactuator is formed on the first conductive layer.

20. The method fabricating an integrated milliactuator/electronics module set forth in claim 19, wherein the second conductive layer is patterned to leave a sacrificial layer in which the milliactuator rotor and stator structures are formed.

* * * * *